US008881749B1

(12) United States Patent
Smith

(10) Patent No.: US 8,881,749 B1
(45) Date of Patent: *Nov. 11, 2014

(54) SYSTEMS AND METHODS FOR CONTROLLING SILICA DUST DURING HYDRAULIC FRACTURING OPERATIONS

(71) Applicant: Sierra Dust Control, LLC, Tatum, TX (US)

(72) Inventor: Kim R. Smith, Tatum, TX (US)

(73) Assignee: Sierra Dust Control, LLC, Tatum, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/178,782

(22) Filed: Feb. 12, 2014

Related U.S. Application Data

(63) Continuation of application No. 13/769,456, filed on Feb. 18, 2013.

(51) Int. Cl.
  *B08B 15/02* (2006.01)
  *B08B 15/00* (2006.01)
  *B60P 1/36* (2006.01)

(52) U.S. Cl.
  CPC *B08B 15/002* (2013.01); *B60P 1/36* (2013.01)
  USPC ......... 134/104.2; 134/133; 15/300.1; 15/301; 15/314; 135/93

(58) Field of Classification Search
  None
  See application file for complete search history.

(56) References Cited

U.S. PATENT DOCUMENTS

| | | | |
|---|---|---|---|
| 8,562,720 B2 | 10/2013 | Stutzman et al. | |
| 8,636,832 B2 | 1/2014 | Stutzman et al. | |
| 2012/0247335 A1* | 10/2012 | Stutzman et al. | ............... 95/272 |
| 2013/0309052 A1* | 11/2013 | Luharuka et al. | ............. 414/291 |

OTHER PUBLICATIONS

Frac Sand Dust Control, Power Point Slides, KSW Environmental, Dec. 6, 2012, http://kswenvironmental.com.
Providing Flexible Solutions for Frac Sand Dust Collection, Website, Frac Sand Dust Control LLC, 2012, http://fracsanddc.com.
Anderson, Travis, Frac-Site Dust Control, Oil & Gas Safety Conference 2012, http://oshasafetyconference.org/events/ugm/osha2012/presentations/anderson.

\* cited by examiner

*Primary Examiner* — Michael Kornakov
*Assistant Examiner* — Ryan Coleman
(74) *Attorney, Agent, or Firm* — James J. Murphy; Thompson & Knight LLP

(57) ABSTRACT

A system for controlling silica dust generated during the transfer of frac sand from a storage container through a conveyor system includes a system of conduits having a plurality of inlets for collecting silica dust generated at selected points along the conveyor system. An air system pneumatically coupled to the system of conduits generates a negative pressure at each of the inlets to induce the collection of silica dust at the selected points along the conveyor.

16 Claims, 14 Drawing Sheets

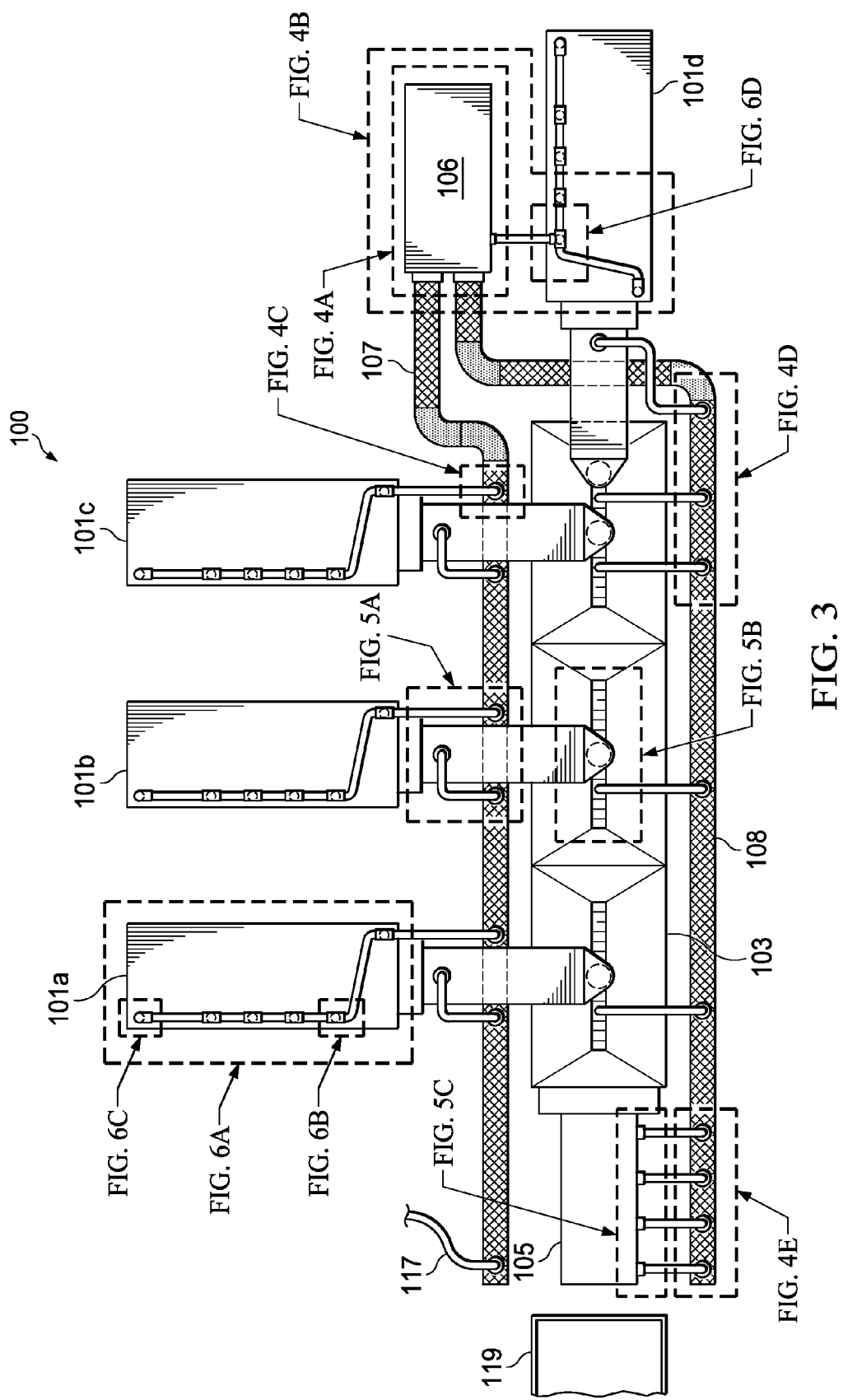

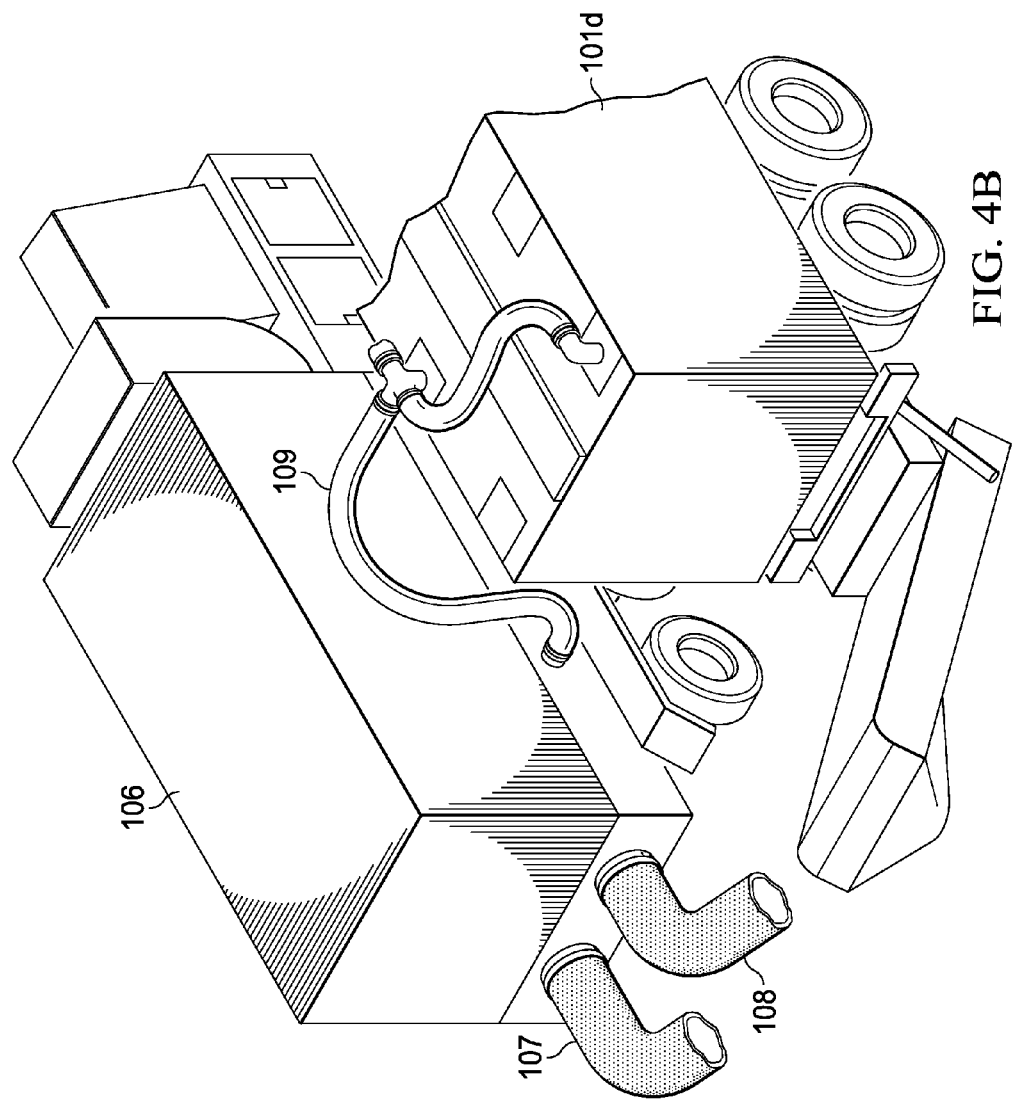

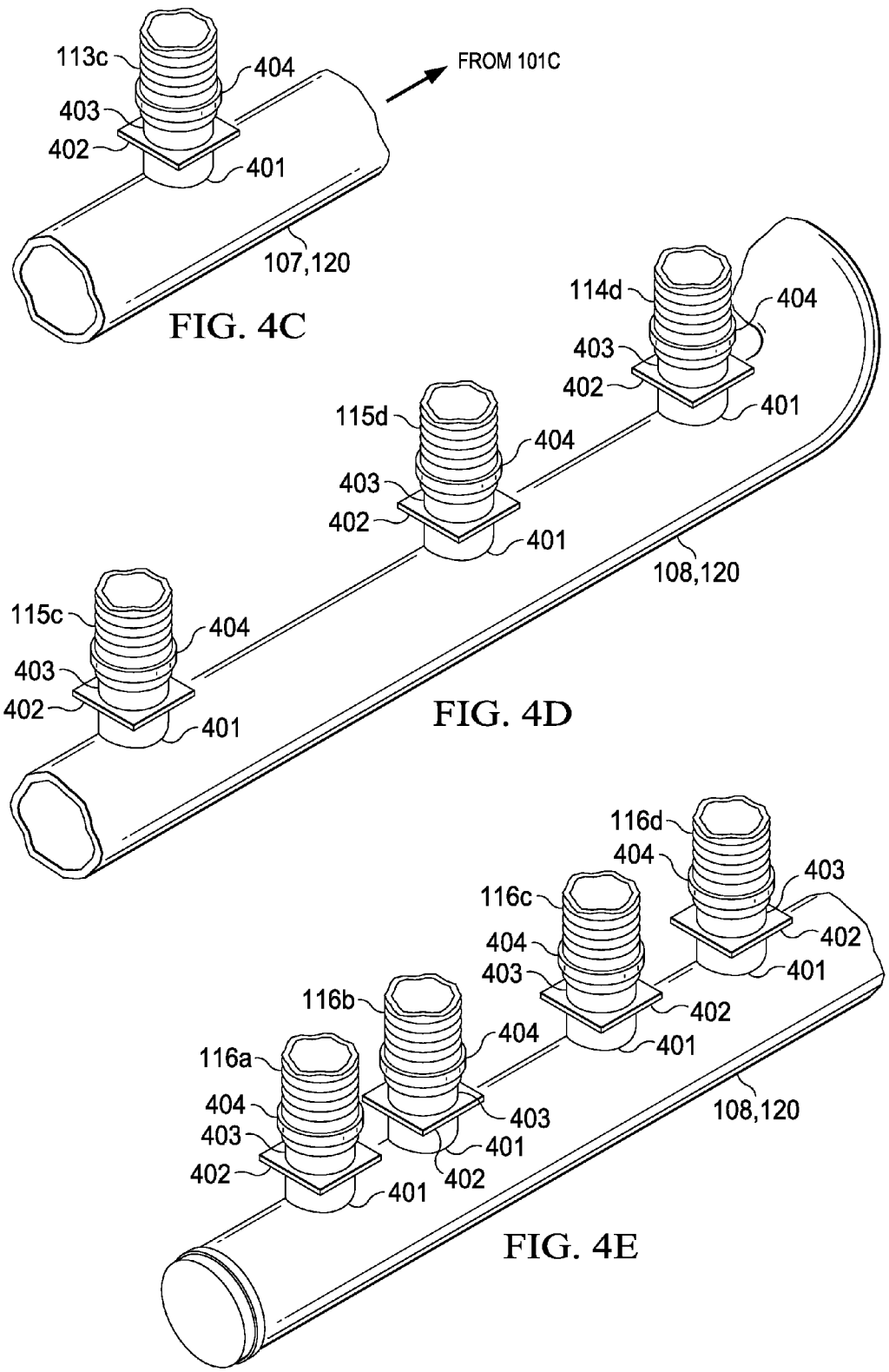

US 8,881,749 B1

SYSTEMS AND METHODS FOR CONTROLLING SILICA DUST DURING HYDRAULIC FRACTURING OPERATIONS

CROSS-REFERENCE TO RELATED APPLICATION

The present application is a continuation of U.S. patent application Ser. No. 13/769,456, file Feb. 18, 2013.

FIELD OF INVENTION

The present invention relates in general to hydraulic fracturing, and in particular to systems and methods for controlling silica dust during the handling of frac sand.

BACKGROUND OF INVENTION

Hydraulic fracturing ("fracing") is a well known technique for releasing oil and natural gas from underground reservoirs within rock formations having a limited permeability. For example, fracing is often used to release oil and natural gas, such as natural gas or oil, from shale formations.

Fracing is a well completion technique performed after the drilling of the wellbore, which in the case of releasing natural gas from shale, is commonly a horizontal wellbore, although occasionally the wellbore is vertical. Fracing fluid, which is primarily water and chemicals that form a viscous gel, is pumped into the well to create fractures within the surrounding rock. The viscous gel carries a "proppant" into the fractures, such that when the pumping stops, the fractures remain substantially open and allow the oil and natural gas to escape into the wellbore.

One typical proppant is "frac sand." Frac sand is normally high purity silica sand with grains having a size and shape capable of resisting the crushing forces applied during the closing of the fractures when the hydraulic force provided by the pumping is removed. However, given that frac sand contains a high proportion of silica, the loading, transportation, and unloading of frac sand presents significant safety challenges.

The United States Occupational Safety and Health Administration ("OSHA") lists silica as a carcinogen. In particular, the exposure and inhalation of silica dust has been linked to silicosis, which is an irreversible lung disorder characterized by inflammation and scarring of the upper lobes of the lungs. The best, and perhaps only way, to reduce or eliminate the threat of silicosis is to carefully control worker exposure to silica dust.

OSHA lists a number of different ways to limit worker exposure to silica dust, including limiting worker time at a worksite, limiting the number of workers at a worksite, watering roads and other worksite areas, enclosing points where silica dust is released, and requiring workers to wear respirators. These techniques do not, at least on their own, provide a complete solution to the problem of controlling silica dust. Furthermore, these existing techniques, while commendable, are nonetheless burdensome, time-consuming, inefficient, and impractical.

SUMMARY OF INVENTION

According to one representative embodiment of the principles of the present invention, a system is disclosed for controlling silica dust generated during the transfer of frac sand from a storage container through a conveyor system and includes a system of conduits having a plurality of inlets for collecting silica dust generated at selected points along the conveyor system. An air system pneumatically coupled to the system of conduits generates a negative pressure at each of the inlets to induce the collection of silica dust at the selected points along the conveyor, including container access ports, belt-to-belt drops, and belt-to-blender drops.

The present inventive principles advantageously provide for efficient and flexible systems and methods for collecting the silica dust generated during the offload of frac sand from one or more trailers or other storage facility at a fracing worksite. In particular, silica dust may be collected, as needed, at the base of the conveyor integral to each trailer ("trailer conveyor"), the point of discharge from each trailer conveyor to an associated portable conveyor system, at points along the portable conveyor system, and from within the trailer itself. The application of these principles improves the efficiency and flexibility of the frac sand offloading process by allowing increased worker time at the worksite and/or for more workers to be present at the worksite at one time, reducing the need for watering of worksite areas and the enclosure of points where silica dust is released, reducing the need for respirator wear, and decreasing the amount of silica dust intake by the engines of nearby vehicles and equipment.

BRIEF DESCRIPTION OF DRAWINGS

For a more complete understanding of the present invention, and the advantages thereof, reference is now made to the following descriptions taken in conjunction with the accompanying drawings, in which:

FIG. 3 is a plan view diagram of the frac sand transportation and unloading system of FIG. 1, which generally indicates the locations of particular structures of the frac sand silica dust control subsystem shown in more detail in FIGS. 4-6;

FIG. 4B is a diagram showing in further detail the direct airflow path between the silica dust control unit and the silica dust control conduit subsystem servicing one selected trailer of FIG. 1;

FIG. 4C is a diagram showing in further detail the pneumatic connection between a selected manifold and the silica dust control conduit subsystem serving another selected trailer of FIG. 1;

FIG. 4D is a diagram showing in further detail the pneumatic connections between a selected manifold and the silica dust capture hose controlling silica dust generated during the operation of a corresponding trailer discharge conveyor shown in FIG. 1;

FIG. 4E is a diagram showing in further detail the pneumatic connections between a selected manifold and the silica dust capture hoses controlling silica dust generated by the system discharge conveyor of FIG. 1;

DETAILED DESCRIPTION OF THE INVENTION

The principles of the present invention and their advantages are best understood by referring to the illustrated embodiment depicted in FIGS. 1-7 of the drawings, in which like numbers designate like parts.

Figure 1:
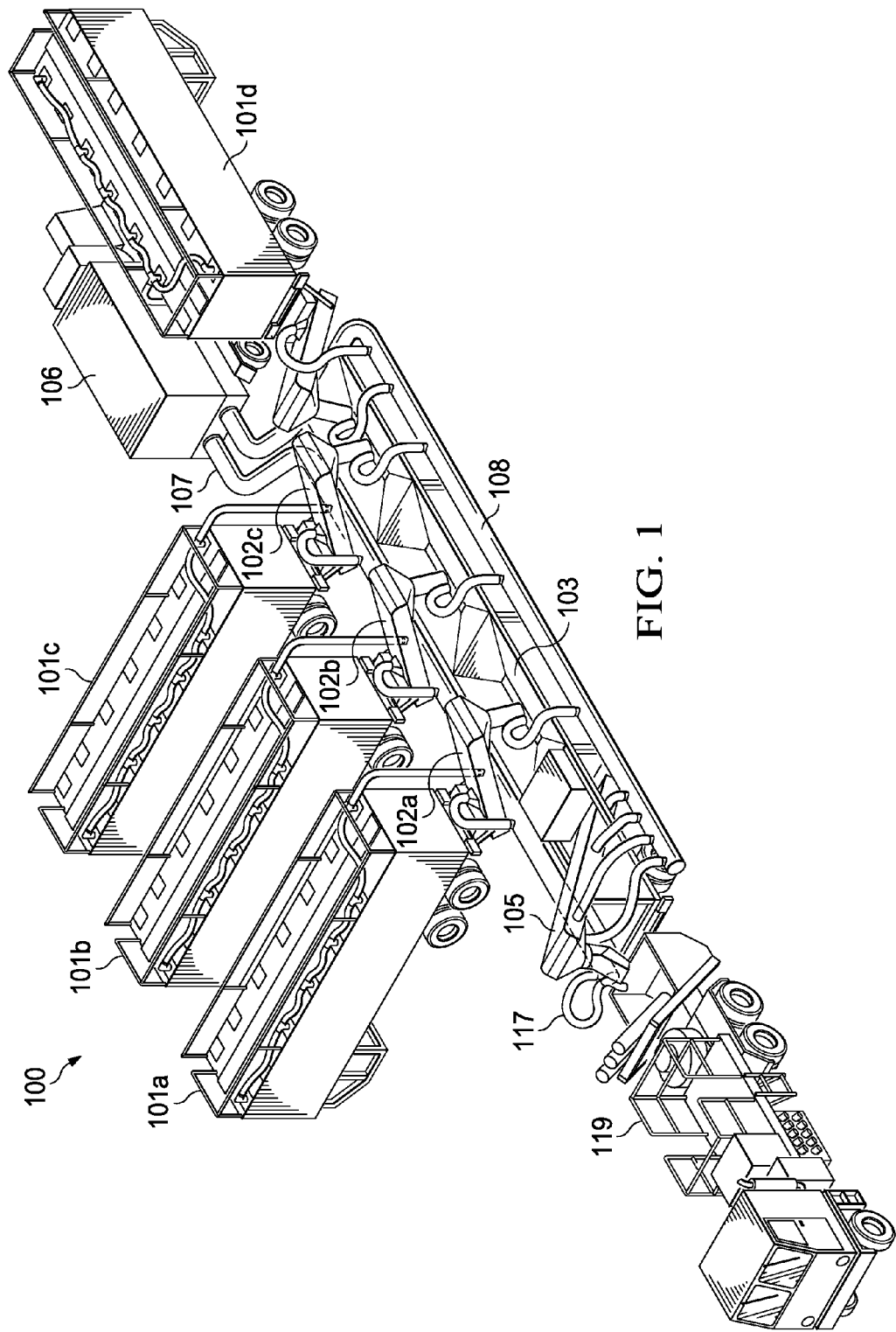
FIG. 1 is a perspective diagram of a representative frac sand transportation and unloading system including a frac sand silica dust control system according to a preferred embodiment of the principles of the present invention.

FIG. 1 is a diagram of an exemplary frac sand transportation, storage, and unloading system 100 including a frac sand silica dust control system according to a preferred embodiment of the principles of the present invention. System 100 is also shown in the plan views of FIGS. 2 and 3, with FIG. 2 emphasizing the air flow paths of the silica dust control system and FIG. 3 generally showing the locations of particular features of the silica dust control system shown in further detail in FIGS. 4-6.

Generally, system 100 is assembled at a hydraulic fracturing worksite and is used to offload frac sand transported to the worksite from a frac sand supplier via trailers and offloaded into a blender. The blender mixes the sand with the water and chemicals to form the fracing fluid. Given the significantly large amounts of frac sand that are typically required during typical hydraulic fracturing operations, a substantial amount of potentially hazardous silica dust is commonly generated during conventional trailer offloading operations. The principles of the present invention advantageously provide for the control of frac sand produced silica dust, which consequently improves personnel safety, helps reduce the need for respirators and other burdensome safety equipment, and allows personnel to work longer and more efficiently at the worksite.

Figure 2:
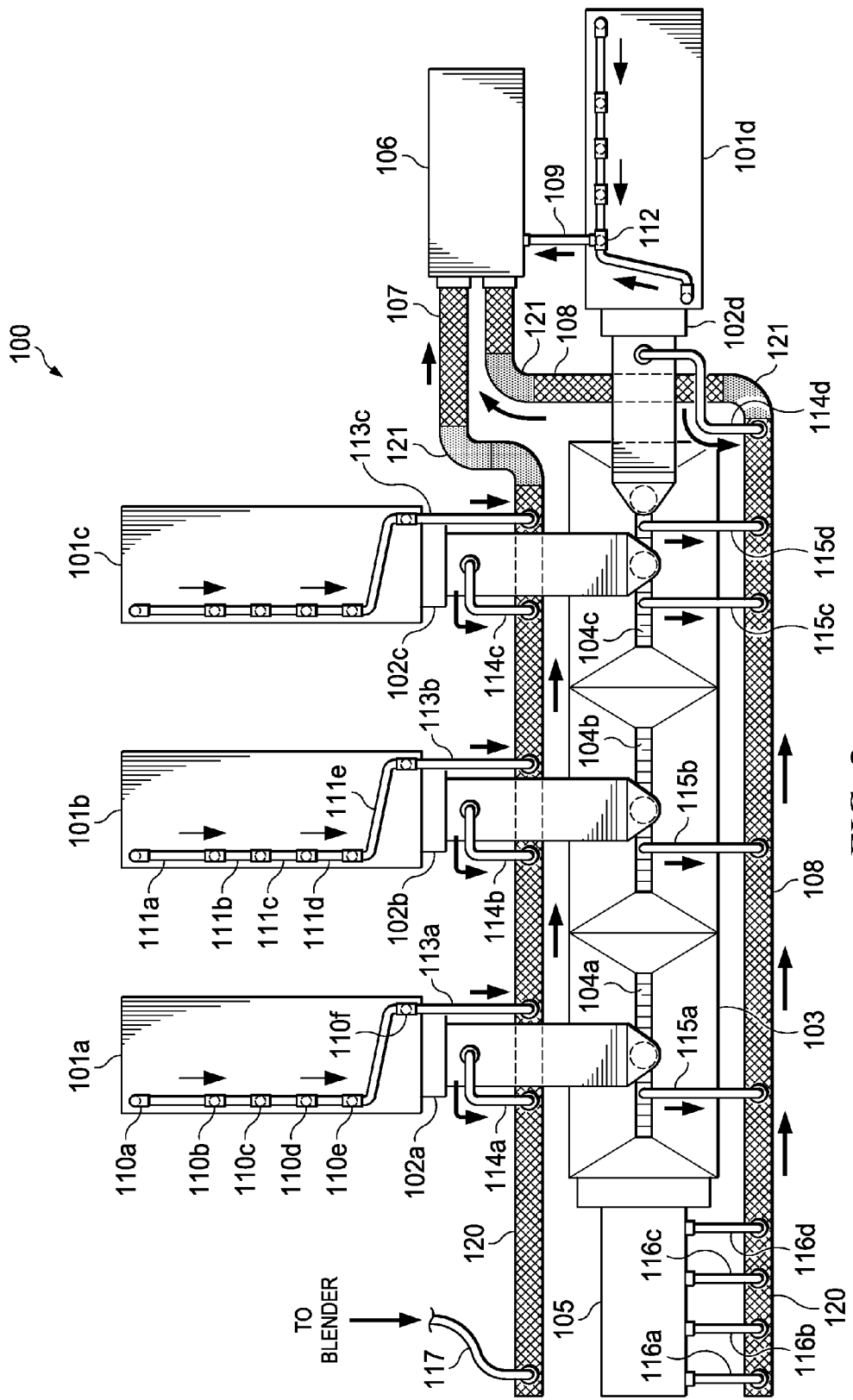
FIG. 2 is a plan view diagram of the frac sand transportation and unloading system of FIG. 1, which emphasizes the airflow paths through the frac sand silica dust control system.

In the illustrated embodiment of system 100 shown in FIGS. 1, 2, and 3, four (4) conventional sand storage trailers 101a-101d are shown at a fracing worksite. While four (4) trailers 101 are shown as an example, the actual number of sand storage trailers 101 utilized in any particular embodiment or configuration of system 100 may vary based on the needs and restrictions at the worksite. The size and configuration of system 100 in any given worksite application will depend on such factors as the amount of sand that must be offloaded, the speed at which sand must be offloaded, and the size and capabilities of the offloading conveyor system. In the illustrated embodiment of system 100, each trailer 101 includes a retractable trailer discharge conveyor (transfer belt) 102a-102d, which receives sand from the compartments of the trailer internal tank via a lateral transfer belt running underneath the trailer tank (not shown). Trailers 101 are, for example, Sand King 3000/4000 frac sand trailers from Convey-All Industries, Inc., although there are a number of other commercially available sand storage trailers known in the art. It should also be recognized that the principles of the present invention are also applicable to embodiments of system 100 in which sand is stored and discharged from other types of fixed and transportable storage systems, such as tanks, silos, compartmented vehicles, and so on.

Each trailer discharge conveyor 102a-102d discharges sand to a conventional transportable conveyor system, for example, Unibelt conveyor system from Convey-All Industries, Inc., which includes a continuous transfer belt running through a lateral conveyor section 103 and a upwardly angled discharge conveyor section 105. During typical offloading operations, one or more randomly selected trailers 101 discharge sand to the lateral conveyor section 103 at a given time.

Sand being discharged by each trailer discharge conveyor 102a-102d falls through slots 104 and onto lateral conveyor section 103. Lateral conveyor section 103 then carries the sand to upwardly angled discharge conveyor section 105, which discharges the sand to a bin of a blender truck 119 (FIGS. 3 and 5C), which mixes the sand with water and chemicals in quantities needed for the formulation of the particular fracing fluid being used.

The amount of sand being transferred at any one time in system 100 can be substantial. For example, a Convey-All Unibelt conveyor can nominally transfer and discharge 22,000 pounds per minute of sand from trailers 101a-101d. The generation of a corresponding substantial amount of fine silica dust is a natural consequence of this transfer and discharge process.

According to the principles of the present invention, silica dust generated during the offloading of trailers 101a-101d is collected by suction at selected points around system 100 most susceptible to the generation and discharge of silica dust. In the preferred embodiment, silica dust is collected: (1) within the compartments of the tanks of trailers 101a-101d; (2) at the base of each trailer discharge conveyor 102a-102d, near the point at which sand is received from the trailer lateral conveyor and the trailer tanks; (3) at the point sand is discharged from trailer discharge conveyors 102a-102d through slots 104 and onto lateral conveyor section 103; (4) at multiple points along upwardly-angled discharge conveyor section 105; and (5) near the point sand is discharged from the spout of discharge conveyor 105 in to the bin of blender 119. It should be noted that in alternate embodiments, silica dust may be collected at additional points, or even fewer points, within system 100, as required.

The silica dust control function of system 100 is driven by a silica dust control unit 106, which draws silica dust-bearing air collected at points across the system though a pair of large manifolds 107 and 108. In the illustrated embodiment of system 100, silica dust control unit 106 also draws silica dust-bearing air directly from trailer 101d through flexible hosing 109, although this is not a strict requirement of the principles of the present invention. Silica dust control unit 106, which may include a baghouse and/or cyclone, separates the silica dust from the air and discharges substantially silica dust-free air into the surrounding environment. One exemplary silica dust control unit, suitable for use as silica dust control unit 106 of system 100, is an ETI Cyclone 20 DC system, available from Entech Industries, which includes multiple twenty-inch (20") inlets and produces a nominal airflow of 20000 cubic feet per minute (cfm).

Silica dust control unit 106 establishes airflow in the direction shown by arrows in FIG. 2. In the preferred embodiment, two intake ports of silica dust control unit 106 are pneumatically connected with manifolds 107 and 108, which run along corresponding sides of lateral conveyor section 103, and one intake port of silica dust control unit 106 is directly pneumatically connected to trailer 101d through flexible hosing 109

Silica dust generated in each of the compartments of trailers 101a-101d is collected through a corresponding set of fittings 110a-110f and hoses 111a-111e. In the illustrated embodiment of system 100, the compartments of trailers 101a-101c are pneumatically coupled to manifold 107 through flexible hosing 113a-113c. For trailer 101d, one fitting 110 is replaced with a four-way fitting 112, which directly pneumatically couples the compartments of trailer 101d with silica dust control unit 106.

Flexible hoses 114a-114c, which tap manifold 107, and the flexible hose 114d, which taps manifold 108, collect silica dust at the bases of each trailer discharge conveyor 102a-102d. Flexible hoses 115a-115d, which tap manifold 108, collect silica dust at the discharge points of trailer discharge conveyor 102a-102d into slots 104a-104c of lateral conveyor section 103. Flexible hoses 116a-116d, which tap manifold 108, collect silica dust moving up upwardly angled discharge conveyor section 105. It should be noted that the pneumatic paths between silica dust collection hoses 113, 114, 115, and 116 and silica dust control unit 106 may vary between embodiments of system 100. In the preferred embodiment of system 100 shown in FIG. 1, the tapping point, as well as the manifold 107 or 108 being tapped, minimizes the lengths of manifolds 107 and 108 and silica dust collection hoses 113, 114, 115, and 116. Generally, so long as sufficient suction is available at a given silica dust collection point, the manifold 107 or 108 tapped, the point on the manifold 107 or 108 tapped the corresponding flexible hose, or both, may be varied.

A flexible hose 117, which taps manifold 107, captures silica dust generated by the discharge of sand from upwardly angled discharge conveyor 105 into the bin of blender 119. (While flexible hose 117 taps manifold 107, in alternate embodiments flexible hose 117 may tap manifold 108).

Manifolds 107 and 108 include a number of straight sections 120 and bent or curved sections 121 and are preferably constructed as tubes or pipes of rigid metal, such as aluminum. Rigid metal embodiments provide durability, particularly when manifolds 107 and 108 sit on or close to the ground and/or are exposed to contact by personnel or to other structures within system 100. However, in alternate embodiments, manifolds 107 and 108 may be constructed, either in whole or in part, from sections of semi-rigid conduit or flexible (corrugated) hose. For example, semi-rigid conduit or flexible hose may be used in sections 121 of manifolds 107 and 108 that must be bent to provide a path around, over, or under, other structures in system 100.

Preferably, manifolds 107 and 108 are each constructed in multiple straight sections 120 and multiple bent or curved sections 121, which are clamped together using conventional clamps. This preferred construction allows manifolds 107 and 108 to be efficiently assembled and disassembled at the worksite, allows the most direct paths to be taken to silica dust control unit 106, and allows the overall system of conduits to be adapted to different configurations of system 100 (e.g., different types and number of trailers 101, different transportable conveyor systems, different surface conditions).

Additionally, the diameters of the various sections of manifolds 107 and 108 may increase or decrease, depending on the airflow provided by the given silica dust control unit 106. The diameters of manifolds 107 and 108 are determined by a number of factors, including the intake diameters of silica dust control unit 106, the airflow produced by silica dust control unit 106, and the amount of suction needed at the silica dust collection points. Similarly, the diameters of silica dust collection hoses 113, 114, 115, and 116 will depend on factors such as the airflow available from silica dust control unit 106, the diameters of manifolds 107 and 108, and the amount of suction required at a given hose inlet. In one typical embodiment of system 100, manifolds 107 and 108 have a nominal diameter of twenty inches (20") and silica dust collection hoses 113, 114, 115, and 116 are nominally within the range of six to sixteen inches (6"-16") in diameter. In other words, the principals of the present invention advantageously allow for variations in the components and configuration of system 100.

It should be recognized that the transportable conveyor system, including lateral conveyor section 103 and discharge conveyor section 105, is not always required. In this case, one or more trailer discharge conveyors 102 discharge sand directly from the corresponding trailers 101 into the bin of blender 119. In embodiments of system 100 that do not utilize the transportable conveyor system, only a corresponding number of flexible hoses 114 and 115 are required for collecting silica dust at the base and outlet of each trailer discharge conveyor 102 discharging to blender 119. (Along with the desired connections for removing dust within the trailers 101 themselves.) Advantageously, only single manifold 107 or 108 may be required in these embodiments.

Figure 4A:
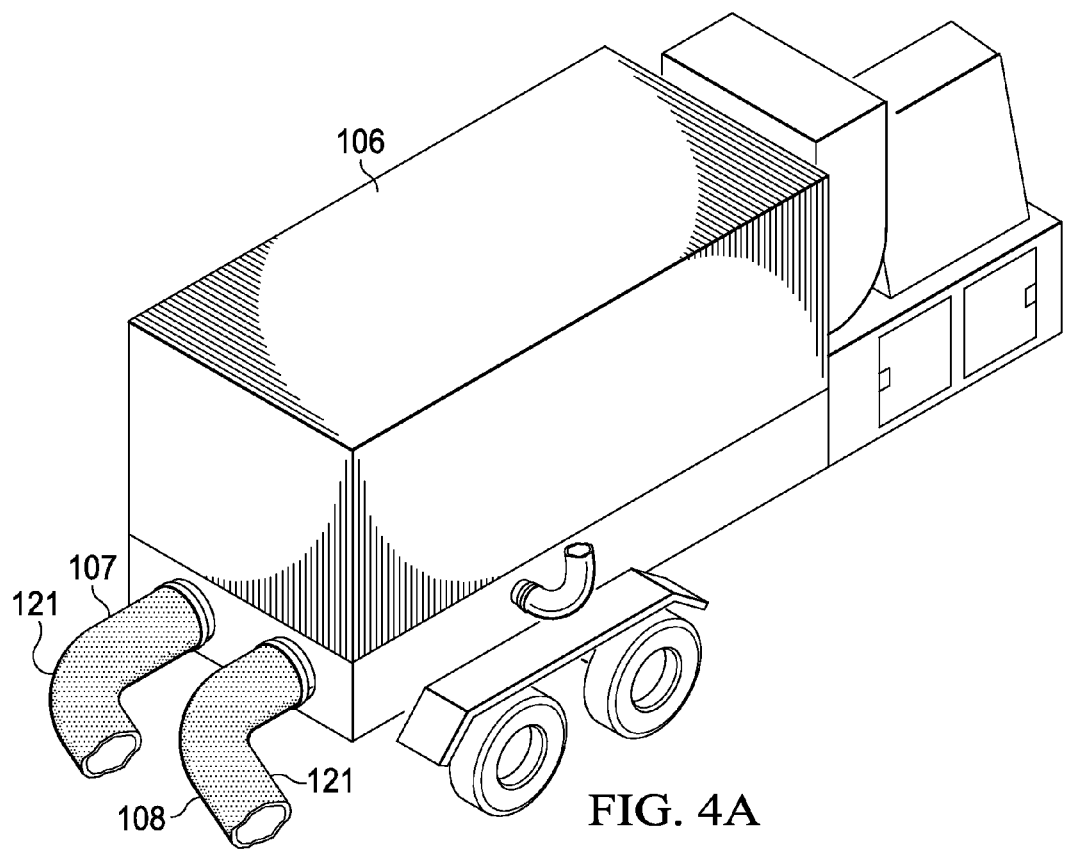
FIG. 4A is a diagram showing in further detail the pneumatic connections between the inlets of the silica dust control unit and the manifolds of FIG. 1.

FIG. 4A is a more detailed diagram showing the pneumatic connections between manifolds 107 and 108 and silica dust control unit 106. FIG. 4B shows the direct pneumatic connection between trailer 101d and silica dust control unit 106 through flexible hose 109 in further detail.

FIGS. 4C-4E illustrate representative tapping points between the heavier rigid sections 120 of manifolds 107 and 108 and selected flexible hoses utilized in system 100. In particular, FIG. 4C shows a representative pneumatic connection between manifold 107 and hose 113c collecting silica dust from the tank compartments of trailer 101c. FIG. 4D shows representative pneumatic connections between manifold 108 and hose 114d, which collects silica dust generated at the base of trailer discharge conveyor 102d, and hoses 115c and 115d, which collect silica dust generated at corresponding outlets of trailer discharge conveyors 102c and 102d. FIG. 4E shows representative pneumatic connections between manifold 108 and hoses 116a-116d collecting silica dust generated by discharge conveyor section 105.

As well known in the art, numerous techniques are commonly utilized for connecting flexible hose with a rigid conduit or pipe, many of which are suitable for use in system 100. In the illustrated embodiment shown in FIGS. 4C-4D, an aperture is tapped through the wall of the given manifold 107 or 108 and the lower periphery of a fitting (e.g., aluminum or steel pipe) 401 is attached, for example, by welding or brazing. The lower section of a coupling 402 is attached to the upper periphery of fitting 401, for example by welding or brazing. The tubular upper section 403 of coupling 402 is received with the periphery of the corresponding hose, which is then clamped in place by one or more conventional clamps 404. When necessary, an extension or elbow (not shown) may be provided between upper section 403 of coupling 402 and the corresponding hose. Similarly, a reduction coupling (see FIG. 5A, designator 501) may be provided between upper section 403 and coupling 402, as required to transition to the selected hose diameter.

In the preferred embodiment shown in FIGS. 4C-4E, each coupling 402 includes a slide gate, which provides for air flow control between the given silica dust capture hose 113, 114, 115, and 116 and the corresponding manifold 107 or 108. In addition to allowing control of the amount of suction produced at the capture hose inlet, these slide gates also allow any unused taps to manifolds 107 and 108 to be completely shut off, particularly when a hose is not connected to coupling 402.

Figure 5A:
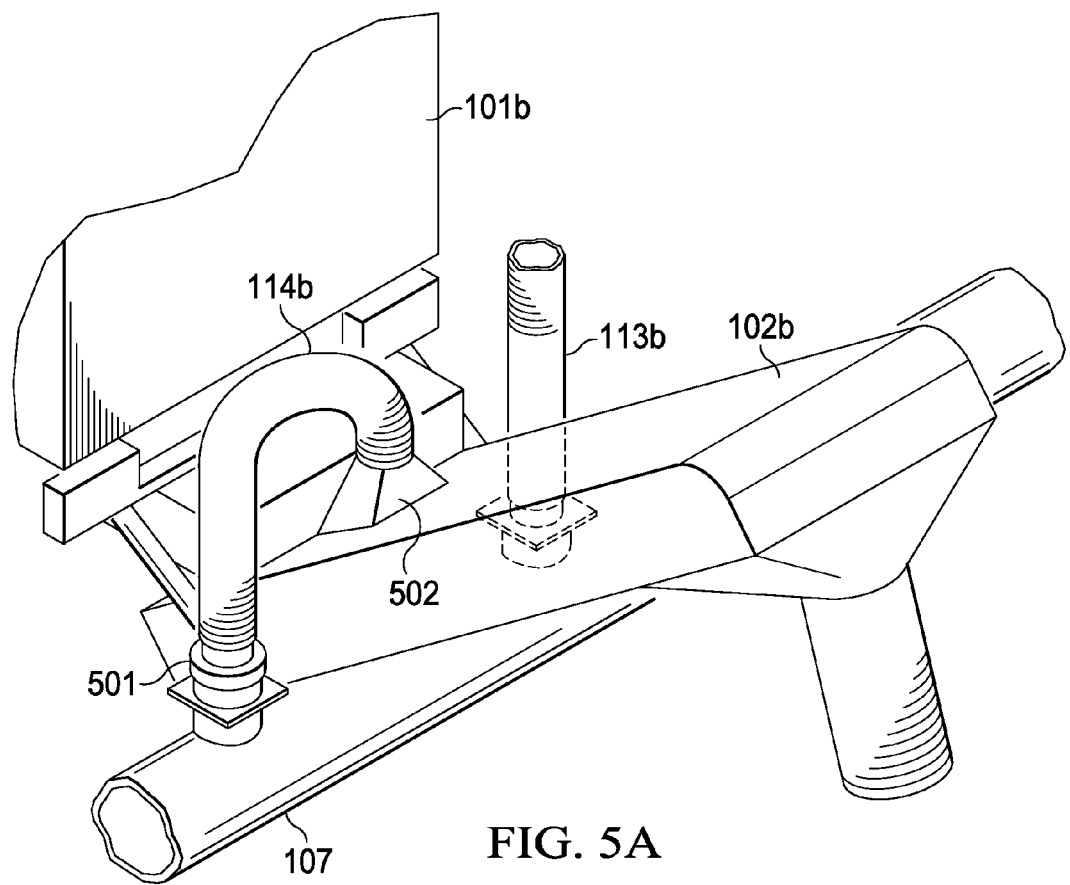
FIG. 5A is a diagram showing in further detail a selected silica dust capture hose controlling silica dust generated by the discharge of frac sand from the tank of representative trailer to the base of the corresponding trailer discharge conveyor shown in FIG. 1.

FIG. 5A depicts in further detail representative silica dust collection hose 114*b* collecting silica dust generated at the base of trailer discharge conveyor 102*b*. Hose 114*b* pneumatically couples with manifold 107 through a reduction coupling 501. The inlet end of hose 114*b*, which includes an optional nozzle or shroud 502, is disposed in a space adjacent the point where the lateral conveyor of trailer 101*b* discharges sand to the base of trailer discharge conveyor 102*b*. Silica dust generated during sand transfer is captured by the suction created by silica dust control unit 106 at the discharge end of hose 114*b* and carried through manifold 107 to silica dust control unit 106 to be filtered from the air. Silica dust collection hoses 114*a*, 114*b*, 114*c*, and 114*d*, which respectively collect silica dust generated at the bases of trailer discharge conveyors 102*a*, 102*b*, 102*c* and 102*d*, are similar in configuration and operation.

Figure 5B:
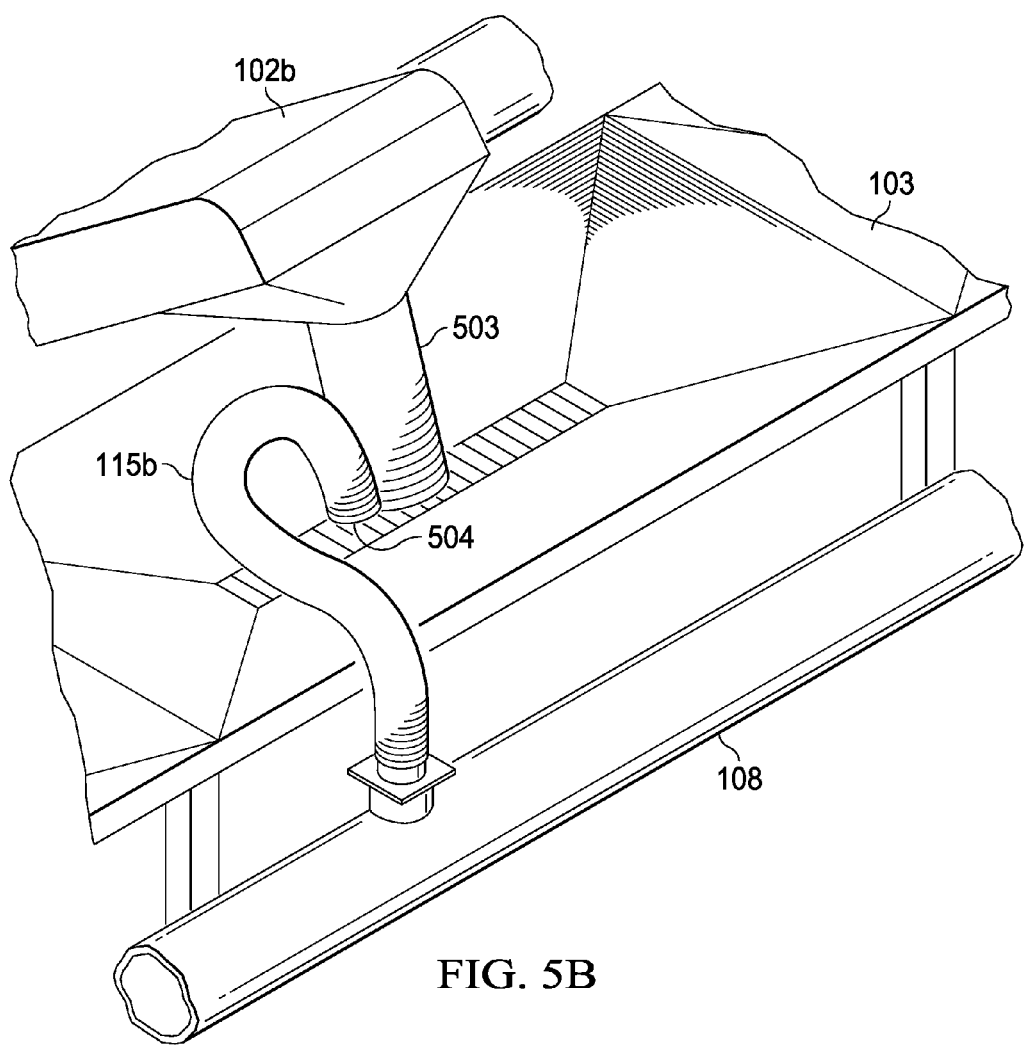
FIG. 5B is a diagram showing in further detail a selected silica dust capture hose controlling silica dust generated by the discharge of frac sand from the outlet of a corresponding representative trailer conveyor to the lateral transfer conveyor section of FIG. 1.

FIG. 5B depicts in further detail representative silica dust collection hose 115*b* collecting silica dust generated during the discharge of sand from trailer discharge conveyor 102*b* into lateral conveyor section 103. In the illustrated embodiment, trailer discharge conveyor 102*b* discharges through a section of flexible hose (conduit) 503 into the corresponding slot 104 of lateral conveyor section 103. The inlet 504 of silica dust collection hose 115*b* is disposed in a space adjacent the outlet of flexible hose 503. The suction produced by silica dust control unit 106 gathers silica dust generated during the transfer of sand, which in turns moves to silica dust control unit 106 for filtering through manifold 108. The configuration and operation of silica dust collection hoses 115*a*, 115*b*, 115*c*, and 115*d*, which respectively collect silica dust from the discharge points of trailer conveyors 102*a*, 102*b*, 102*c*, and 102*d* into lateral conveyor section 103 are similar.

Figure 5C:
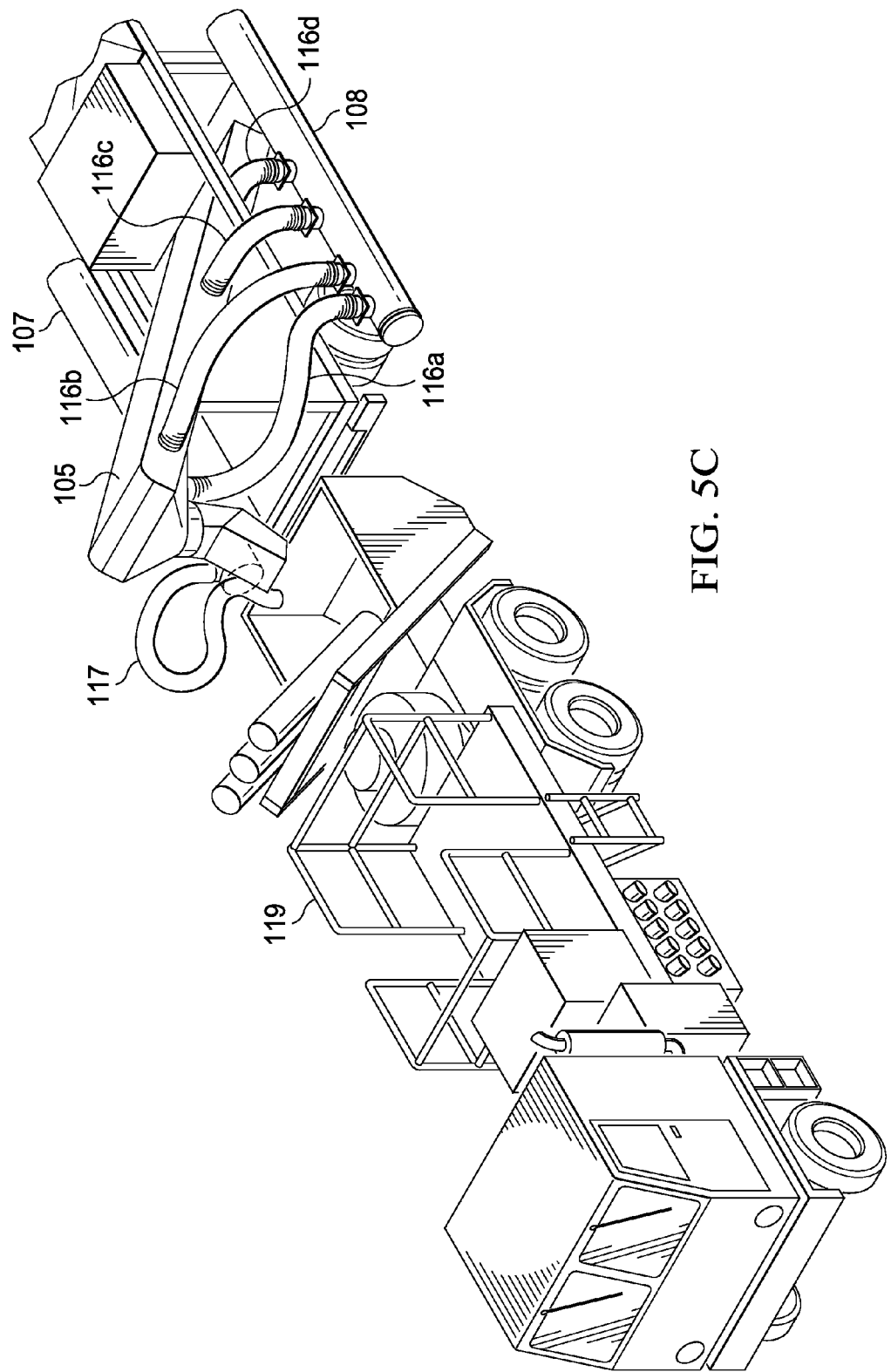
FIG. 5C is a diagram showing the hoses controlling silica dust generated during the movement of sand by the upwardly angled conveyor section of FIG. 1 to a point above the bin of the blender of FIG. 1, along with the silica dust capture hose controlling silica dust generated during the discharge of sand into the blender bin from the conveyor section spout.

Silica dust collection hoses 116*a*-116*d*, and the suction generated by silica dust control unit 106, collect silica dust generated by the lifting and discharge of sand by discharge conveyor section 105. As shown in FIG. 5C, silica dust collection hoses 116*a*-116*d* extend from apertures through the body of discharge conveyor section 105 at selected spaced-apart points. During operation, silica dust generated as sand moves upwards towards the outlet spout is removed through silica dust collection hoses 116*a*-116*d* and manifold 108 for filtering by silica dust control unit 106.

FIG. 5C also one possible configuration for flexible 117 with respect to the spout of upwardly angled conveyor 105. Generally, the intake end of flexible hose 117 is located near the discharge point of the spout of conveyor 105 and creates an updraft, which captures silica dust generated as sand falls into the bin of blender 119. The actual attachment point of flexible hose 117 to the spout of conveyor 105, as well as the proximity of the intake end of hose 117 to the blender bin, may vary in actual practice of system 100.

Figure 6A:
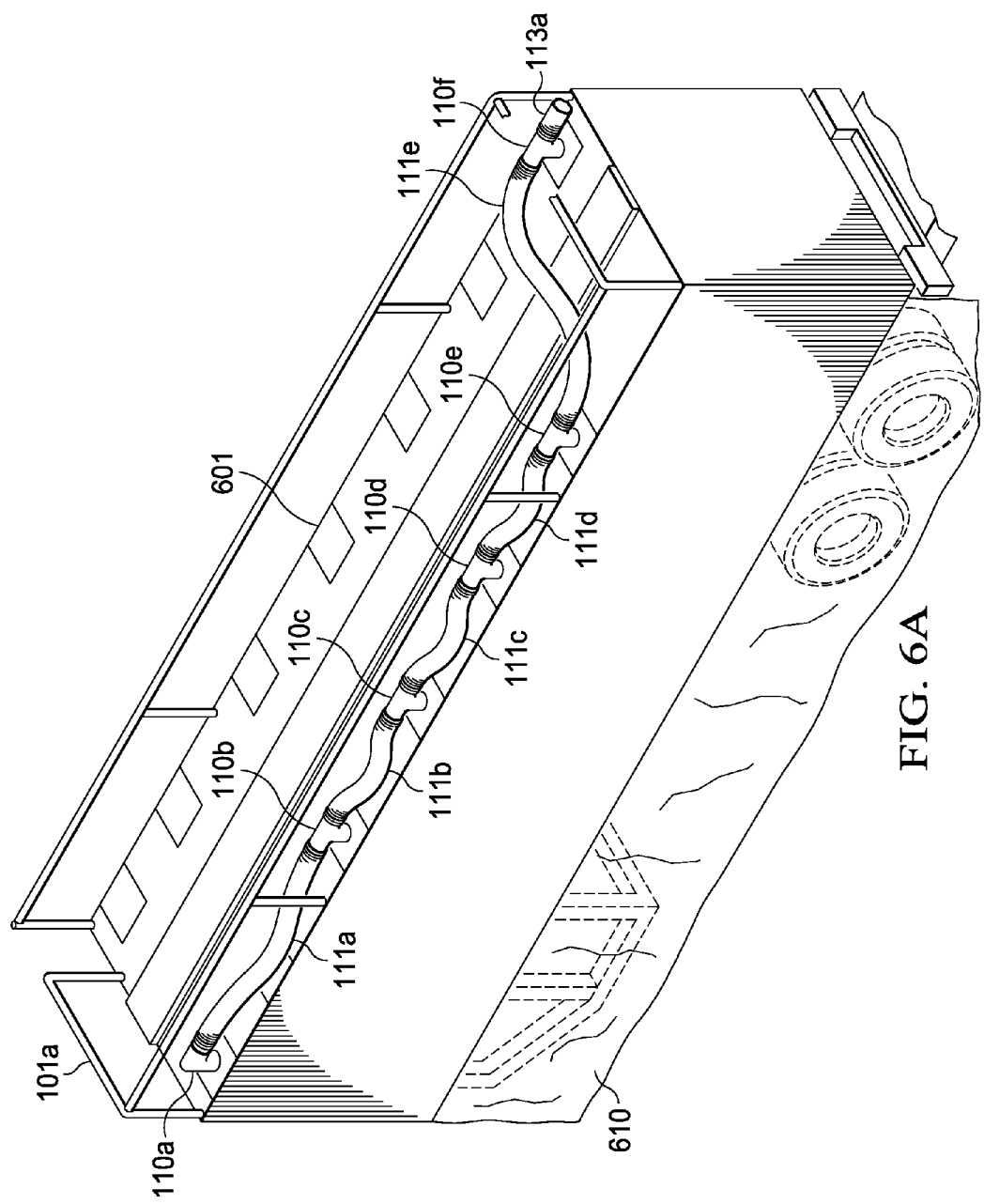
FIG. 6A is a diagram showing in further detail the pneumatic connections of the silica dust control conduit subsystem of a representative one of the trailers of FIG. 1.
Figure 6B:
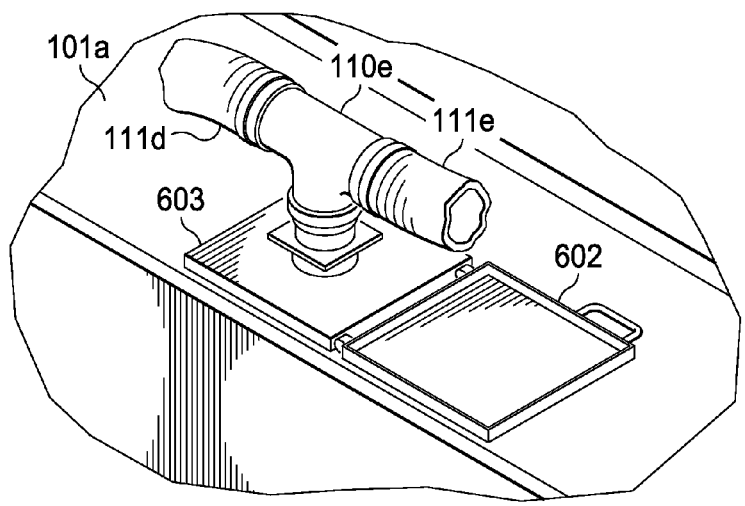
FIG. 6B is a diagram showing in further detail one of the T-fittings interconnecting the air conduits of the silica dust control conduit subsystem shown in FIG. 6A.
Figure 6C:
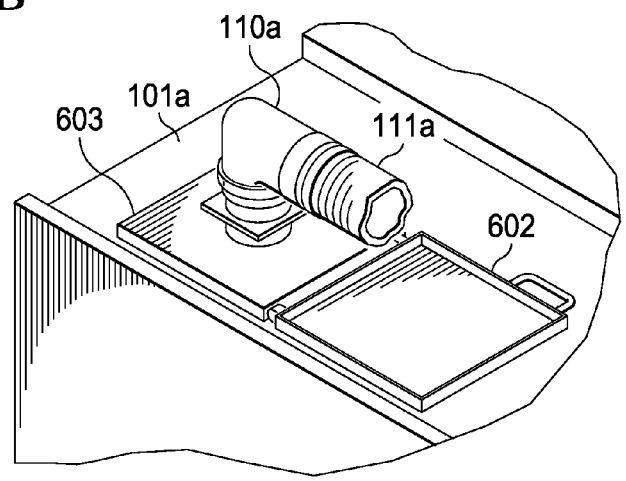
FIG. 6C is a diagram showing a one of the end fittings terminating the air conduits of the silica dust control conduit subsystem shown in FIG. 6A.

As discussed above, silica dust generated in the compartments of the tanks of trailers 101*a*-101*d* is collected by a set of fittings 110 and hoses 111. FIGS. 6A-6C depict this subsystem in further detail, using trailer 101*a* as an example.

Each trailer 101 includes a set of inspection hatches 601 through the trailer roof. In the illustrated embodiment, trailers 101 include two rows of hatches 601 that run along opposing sides of the trailer roof. (In other embodiments of trailers 101, the number and location of inspection hatches 601 may differ. For example, some commercially available sand storage trailers utilize a single row of inspection hatches that run along the centerline of the trailer roof.)

In addition, FIG. 6A shows optional skirts 610, which run along each side of the depicted trailer 101. Skirts 610, which are preferably constructed from a durable flexible material, such as heavy plastic or canvas, contain silica dust generated by the movement of sand through the lateral conveyor that runs underneath the trailer tank.

Figure 6D:
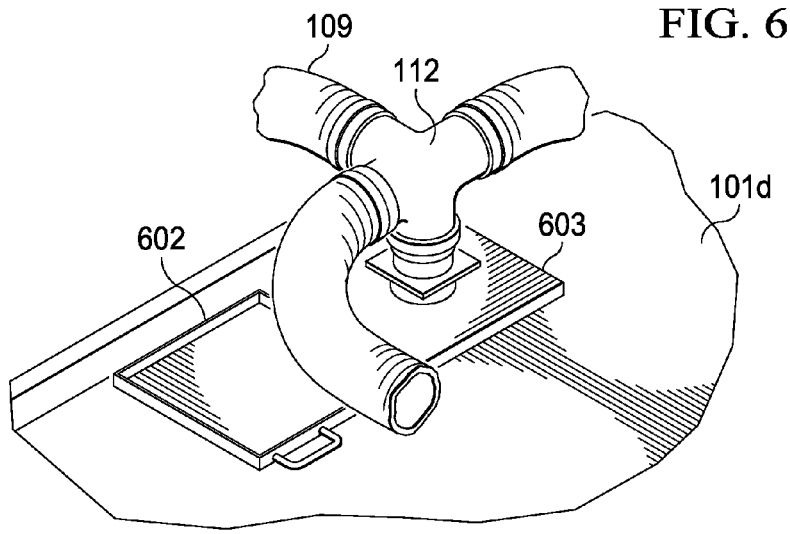
FIG. 6D is a diagram showing the four-way fitting interconnecting the air conduits of the silica dust control subsystem of one particular trailer with the silica dust control unit, as shown in FIG. 4B.

In the preferred embodiment of system 100, silica dust collection is performed using the hatches 601 running along one side of the trailer tank, although in alternate embodiments silica dust collection could be performed using the hatches running down both sides of the trailer tank. For a given compartment, the regular hatch 602 is pulled back and replaced with corresponding cover 603 attached an associated fitting 110 (FIGS. 6B-6D).

FIG. 6B shows in further detail an example of a T-shaped (three-way) fitting 110*e* interfacing with corresponding hoses 111*d* and 111*e*. FIG. 6C shows an example of a elbow (two-way) fitting 110*a* and the final section of hose 111*a* in the trailer silica dust subsystem. The remaining connections between the given trailer 101 and fittings 110 and 111 are similar. The four-way fitting 112 used to connect trailer 101*d* and silica dust control unit 106 through hose 109 is shown in detail in FIG. 6D. In each case, fittings 110 include well-known transitions and clamps to connect to hoses 111. Similar to the taps shown in FIGS. 4C-4E, each fitting, such as T-shaped (three-way) fitting 110*e*, elbow fitting 110*a*, and four-way fitting 112, includes a slide gate for controlling airflow between the space within the given trailer 101 and manifold 107.

Figure 7A:
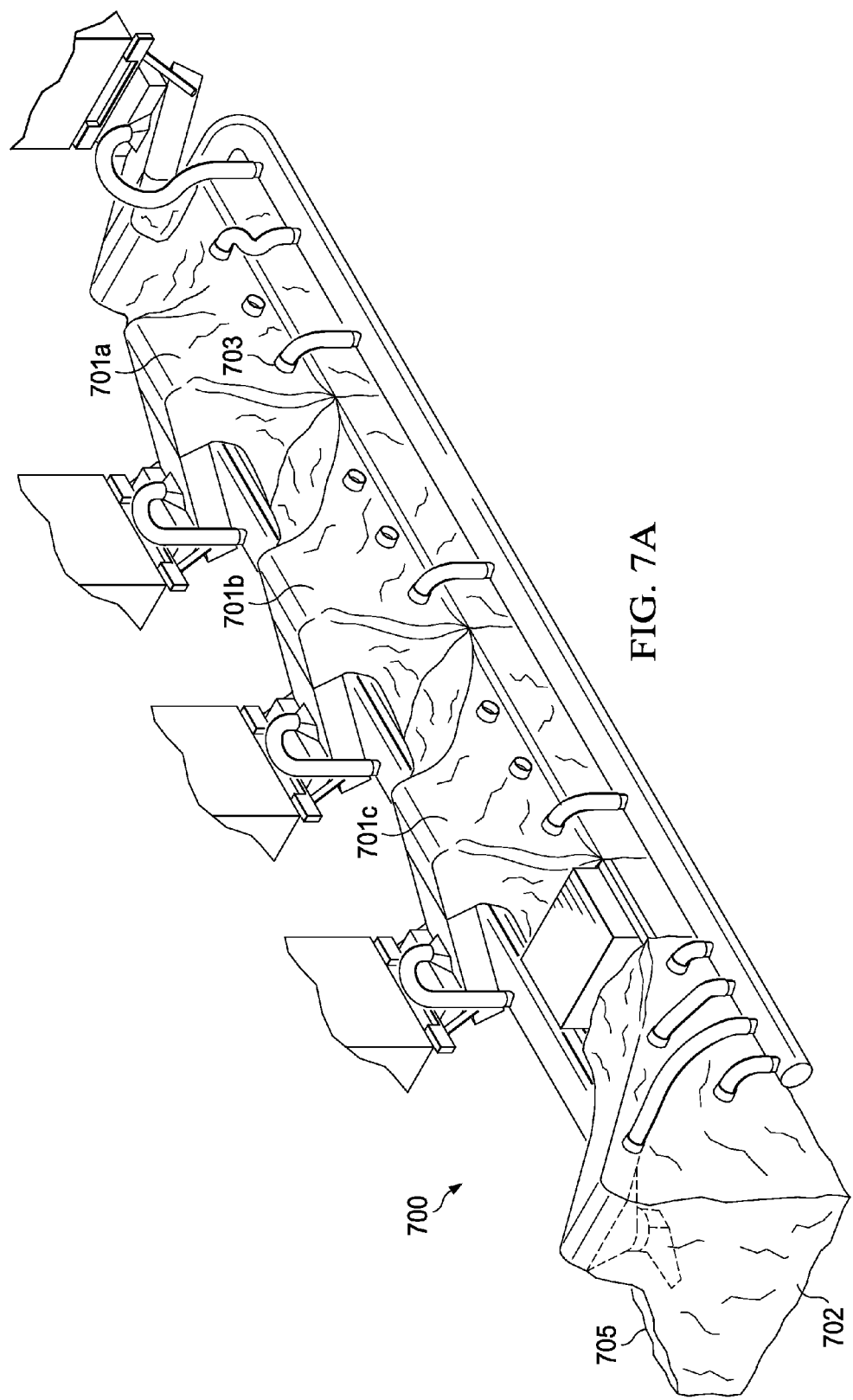
FIG. 7A is a diagram showing an alternate embodiment of the principles of the present invention in which a cover is provided over portions of the representative frac sand transportation and unloading system of FIG. 1 for containing silica dust generated during movement of sand through the system.
Figure 7B:
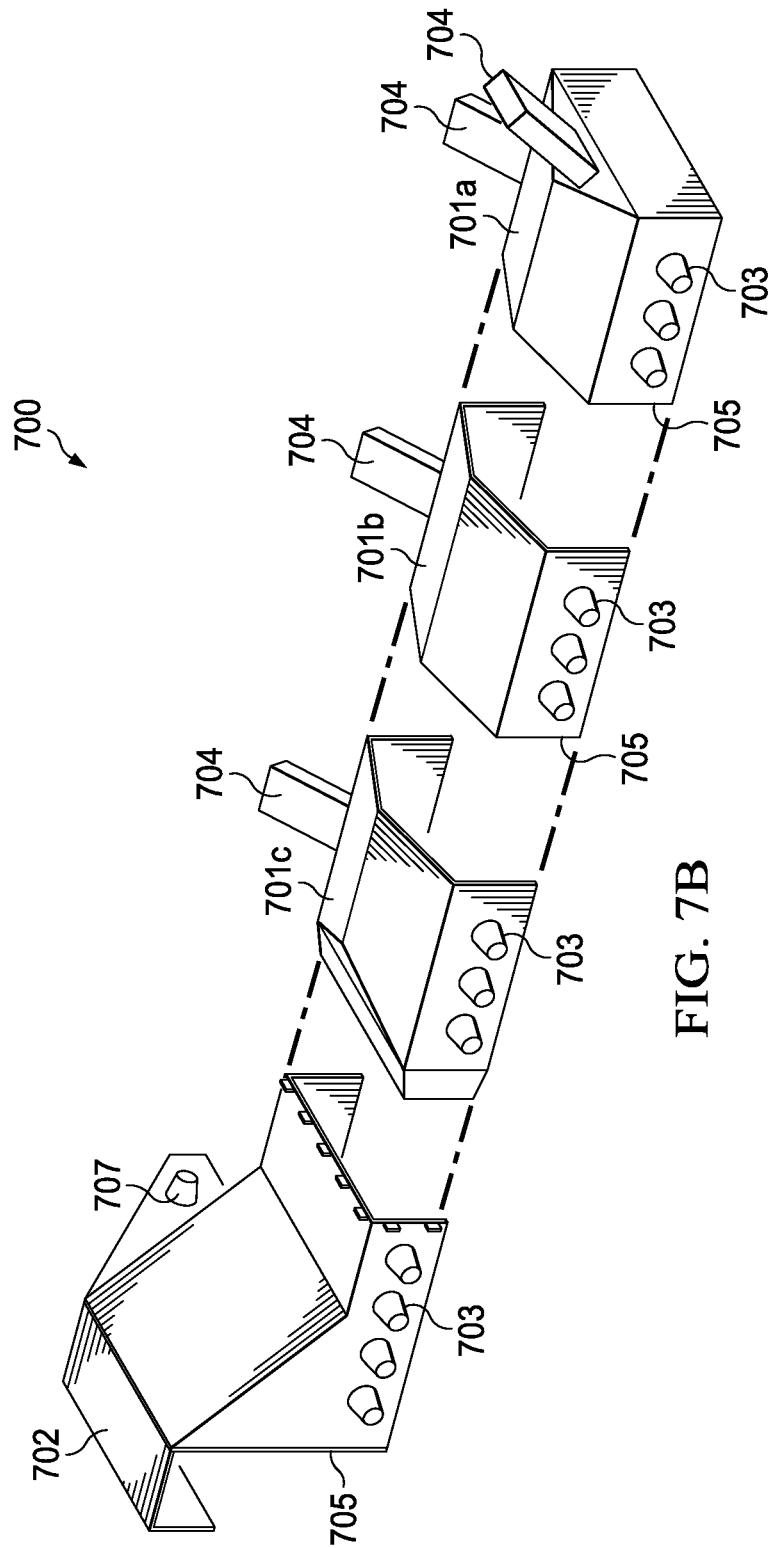
FIG. 7B is a conceptual diagram providing a first detailed view of a representative embodiment of the cover shown in FIG. 7A.
Figure 7C:
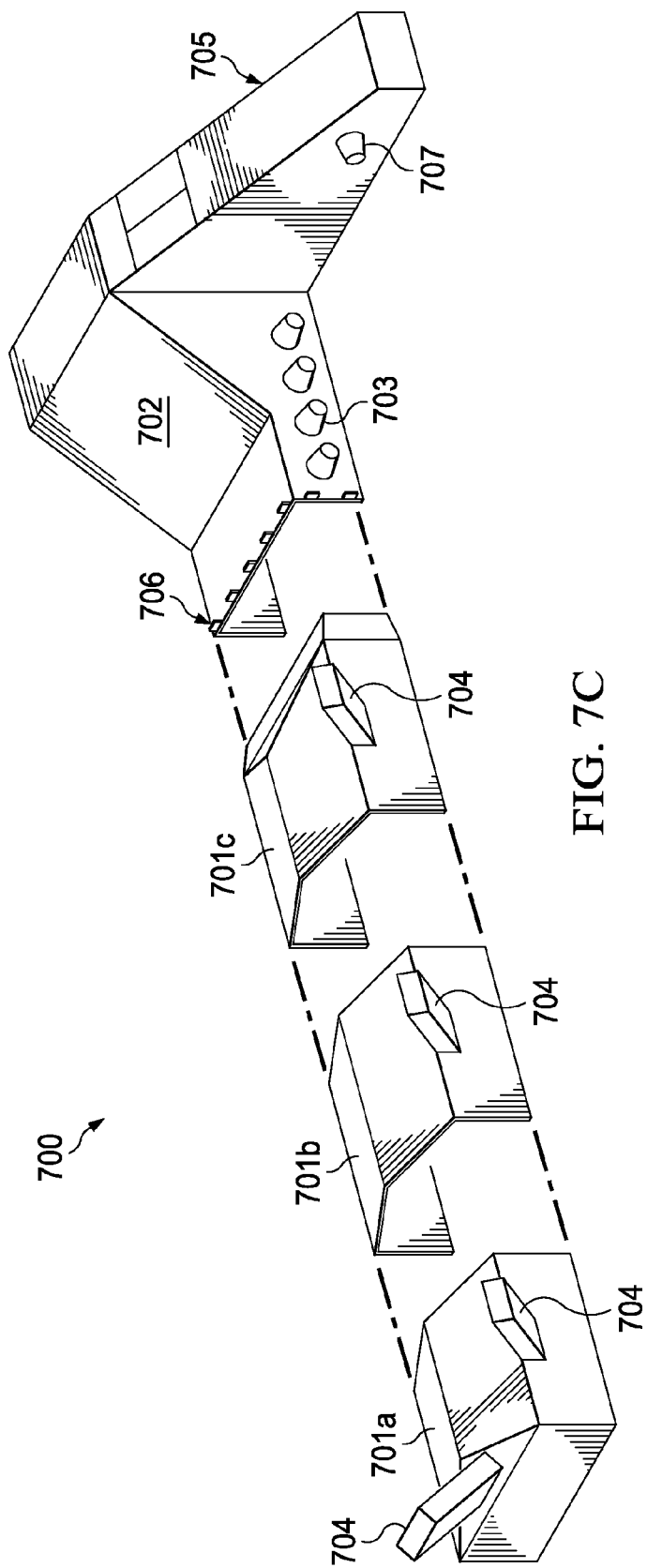
FIG. 7C is a conceptual diagram providing a second detailed view of the representative embodiment of the cover shown in FIG. 7A.

FIGS. 7A-7C illustrate an enhancement to system 100, which includes a flexible cover system 700 for containing the silica dust generated during the movement of sand through the system. Preferably, flexible cover system 700 extends over the discharge ends of trailer discharge conveyors 102*a*-102*d*, the length of lateral conveyor section 103, and the length of upwardly angled discharge conveyor section 105. (In alternate embodiments, flexible cover system 700 may only cover portions of system 100, as necessary to effectively control silica dust.)

In the preferred embodiment, flexible cover system 700 is constructed as separate sections 701*a*-701*c* and 702, as shown in FIGS. 7B and 7C. Sections 701*a*-701*c* cover corresponding portions of lateral conveyor section 103 and section 702 covers upwardly angled discharge conveyor section 105. Boots 703 are provided to allow insertion of corresponding flexible capture hoses 115 and 116 into the underlying silica dust containment spaces when cover system 700 is deployed. Boots 704 extend over the ends of trailer discharge conveyors 102*a*-102*d*.

Section 702 also includes a lateral extension 705 for covering the spout of upwardly angled discharge conveyor section 105. A boot 707 provides for the insertion of flexible hose 117 into extension 702 for fastening on or near the outlet of the discharge spout of conveyor 105.

Flexible cover system 700 is preferably constructed of canvas, heavy plastic, or other flexible material that is durable, relatively easy to deploy and remove, and transportable. Preferably, the surfaces of the selected material are impervious to frac sand, as well as able to withstand the normal wear and tear expected at a fracing worksite. When deployed, sections 701 and 702 are attached to each other with areas of Velcro 706 or similar attachment system, which minimizes the escape of silica dust at the seams between the sections.

In sum, the principles of the present invention provide for the efficient capture and removal of silica dust generated during the offloading of frac sand at a worksite. Silica dust removal is performed near, but not limited to, substantial sources of hazardous silica dust, including at trailer to trailer conveyor sand transfer point, each point of transfer from the trailer discharge conveyors and the lateral site conveyor, and points along the lifting/discharge conveyor. The embodiments of the inventive principles are scalable, and can be applied to any discharging system serving single or multiple frac sand storage trailers and can be implemented with various commercially available cyclone/baghouse silica dust removal systems. Moreover, the configuration and construction of these embodiments are also variable, allowing silica dust control to be effectively implemented under widely varying worksite conditions.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A dust control system for capturing dust generated during movement of sand through a sand delivery system, comprising:
    a manifold system including at least one manifold laying on the ground;
    a plurality of flexible conduits in fluid communication with the manifold system, each of the plurality of conduits having a first end coupled to the at least on manifold and a second end for positioning proximate a corresponding one of a plurality of space-apart points along a longitudinal axis of a conveyor forming a portion of the sand delivery system, the second end of each flexible conduit including an inlet for capturing dust in a space proximate the corresponding point during movement of sand along the conveyor system;
    a cover extending substantially along an entire length of the conveyor and enclosing the space proximate each of the plurality of spaced-apart points along the longitudinal axis of the conveyor and the inlet of the corresponding flexible conduit; and
    an air system in fluid communication with the manifold system and the plurality of flexible conduits for drawing air containing dust through the inlets of the flexible conduits.

2. The dust control system of claim 1, wherein the cover comprises at least one flexible sidewall for covering at least a portion of the conveyor, the at least one flexible sidewall including a plurality of apertures each for allowing a corresponding one of the plurality of flexible conduits to extend through the cover thereby allowing the second end of said flexible conduit to be positioned proximate the corresponding one of the plurality of longitudinally spaced-apart points along the conveyor.

3. The dust control system of claim 2, wherein the conveyor comprises a lateral conveyor for transporting sand generally parallel to the ground and the cover is adapted to enclose substantially an entire length of the lateral conveyor.

4. The dust control system of claim 2, wherein the conveyor comprises a lifting conveyor for lifting sand at an angle to the ground and the cover is adapted to enclose substantially an entire length of the lifting conveyor.

5. The dust control system of claim 1, further comprising a flexible conduit in fluid communication with the manifold system and the air system and having a first end coupled to the at least one manifold and a second end including an inlet for capturing dust within a space within a sand transportation trailer forming a portion of the sand delivery system.

6. The dust control system of claim 1, further comprising a flexible conduit in fluid communication with the manifold system and the air system and having a first end coupled to the at least one manifold and second end including an inlet for capturing dust in a space proximate a sand transfer point between a sand transportation trailer forming a portion of the sand delivery system and a trailer conveyor offloading sand from the sand transportation trailer.

7. The dust control system of claim 1, wherein the conveyor comprises a lifting conveyor for lifting sand at an angle to the ground and the dust control system further comprises a flexible conduit in fluid communication with the manifold system and the air system and having a first end coupled to the manifold system and a second end having an inlet for capturing dust in a space proximate a spout of the lifting conveyor.

8. The dust control system of claim 7, wherein the spout of the lifting conveyor discharges the sand to a blender forming a portion of the sand delivery system and the cover is further adapted to enclose the spout and at least a portion of the blender.

9. A sand distribution system comprising:
    a container for storing sand;
    a conveyor for moving sand from the container to a discharge point;
    a conduit system and air unit in fluid communication with conduit system for drawing air through the conduit system to capture dust through a plurality of inlets to the conduit system, the conduit system comprising:
    a manifold laying on the ground;
    at least one first flexible conduit having a corresponding one of the plurality of inlets for capturing dust within a space within the container; and
    a plurality of second flexible conduits coupled to the manifold and each having an inlet for capturing dust in a space proximate a corresponding one of a plurality of spaced-apart dust capture points along the conveyor; and
    a flexible cover having an interior space for containing the dust in the space proximate each of the dust capture points along substantially an entire length of the conveyor.

10. The system of claim 9, wherein the container comprises a trailer and the inlet of the at least one first flexible conduit captures dust through an aperture through a top wall of the trailer.

11. The system of claim 9, wherein the flexible cover is fabricated from a material selected from the group consisting of canvas and plastic sheeting.

12. The system of claim 9, wherein the conduit system further comprises at least one rigid manifold in fluid communication with the at least one flexible conduit.

13. The system of claim 9, wherein the manifold of the conduit system comprises a rigid manifold in fluid communication with the plurality of second flexible conduits.

14. The system of claim 9, wherein the container is associated with a container discharge conveyor and the conveyor system comprises a lateral conveyor for receiving sand from the discharge conveyor at a corresponding one of the dust capture points.

15. The system of claim 9, wherein the conveyor system comprises a lateral conveyor system for moving sand generally parallel to the ground and at least one of the capture points is disposed along the lateral conveyor system.

16. The system of claim 9, comprises a lifting conveyor for lifting sand at an angle to the ground and at least one of the capture points is disposed along the lifting conveyor.

* * * * *